United States Patent
Ament et al.

[11] Patent Number: 5,570,576
[45] Date of Patent: Nov. 5, 1996

[54] CATALYST HEATER WITH STAGED EXHAUST EXOTHERM

[75] Inventors: Frank Ament, Troy; David B. Brown, Shelby Township, both of Mich.

[73] Assignee: General Motors Corporation, Detroit, Mich.

[21] Appl. No.: 270,335

[22] Filed: Jul. 5, 1994

[51] Int. Cl.[6] .................................................. F01N 3/10
[52] U.S. Cl. .......................... 60/300; 60/274; 60/303; 60/317
[58] Field of Search .................... 60/300, 303, 317, 60/282, 274; 431/5

[56] References Cited

U.S. PATENT DOCUMENTS

| | | | |
|---|---|---|---|
| 3,775,064 | 11/1973 | Berger et al. | 60/303 |
| 4,538,413 | 9/1985 | Shinzawa et al. | 60/303 |
| 4,541,239 | 9/1985 | Tokura et al. | 60/303 |
| 4,604,868 | 8/1986 | Nomoto et al. | 60/303 |
| 4,610,138 | 9/1986 | Shinzawa et al. | 60/303 |
| 4,858,431 | 8/1989 | Leonhard et al. | 60/303 |
| 5,082,478 | 1/1992 | Oono et al. | 60/303 |
| 5,105,621 | 4/1992 | Simmons et al. | 60/303 |
| 5,320,523 | 6/1994 | Stark | 60/303 |
| 5,417,059 | 5/1995 | Härtel et al. | 60/303 |

*Primary Examiner*—Leonard E. Heyman
*Attorney, Agent, or Firm*—Michael J. Bridges

[57] ABSTRACT

Internal combustion engine exhaust gas is combined with heat energy emitted by an exhaust gas heater in a staged manner through an interface that diverts portions of the exhaust gas into a number of mixing stages with the heat energy, so that exhaust gas temperature may be elevated to levels supporting exothermic oxidation of exhaust gas elements, contributing additional heat energy to that emitted by the heater to provide for rapid catalytic converter heating following a coldstart of the engine.

5 Claims, 4 Drawing Sheets

CATALYST HEATER WITH STAGED EXHAUST EXOTHERM

FIELD OF THE INVENTION

This invention relates to automotive catalytic converter heating and, more particularly, to combining automotive internal combustion engine exhaust gas with heat energy output by a catalytic converter heater.

Background of the Invention

Engine exhaust gas may be passed through a catalyst treatment device such as a catalytic converter to reduce emission of undesirable exhaust gas constituents, such as hydrocarbons HC, carbon monoxide CO, and oxides of nitrogen Nox. To become catalytically active following a cold start of the engine, catalytic converters rely on heat energy in the exhaust gas passing therethrough. Initiation of catalyst activity occurs at converter light-off temperature, which is typically around 350 degrees Celsius. Following a cold start, the engine may have to operate for over 100 seconds before heat energy transferred from the engine exhaust to the converter elevates the converter temperature to light-off, such that efficient conversion may occur.

To reduce the period of time before the light-off temperature is reached after a cold start, exhaust gas heating devices may be provided to introduce additional heat energy in the engine exhaust gas path after a cold start. Heaters have been considered for exhaust gas heating in which an air/fuel mixture is combusted and the combustion heat energy therefrom drawn into the engine exhaust gas path. To minimize the time to catalyst light-off, such heaters must be ignited as soon as possible after a start time, and once ignited, must be operated in a manner wherein maximum heat energy is transferred to the engine exhaust path and ultimately to the converter.

In addition to the heat energy transferred from the heater to the catalytic converter, a significant source of heat energy is found in the oxidation of the exhaust gas elements of HC and CO. The exothermic oxidation reaction of these elements occurs when the elements are elevated to very high temperature for a significant period of time in the presence of excess oxygen. During an engine cold start, the addition of the energy from this exotherm to that output by the heater can reduce the time to catalyst light-off. Additionally, the oxidation reaction of HC and CO reduces the burden on the catalytic converter to reduce or eliminate the undesirable elements of CO and HC, as a lower HC and CO content is passed to the converter inlet. During an engine cold start, it is especially important to minimize the burden on the converter, which may not yet be at an efficient operating temperature.

The oxidation temperature of HC is approximately 850 degrees Celsius and that of CO is approximately 900 degrees Celsius. To elevate the relatively cool engine exhaust gas to such high temperatures following an engine cold start requires a significant heat source and a large supply of oxygen. Even using a significant heat source, such as a fuel-consuming heater, the large volume of relatively cool engine exhaust gas that is mixed with the heater output will quench the heat energy of the heater output, wherein the temperature of the mixture will rapidly drop below a minimum temperature threshold needed to support oxidation of either HC or CO. Such a rapid drop in temperature allows little time for any significant oxidation activity. Furthermore, a large air pump or blower may be used to provide the large supply of oxygen needed to support any oxidation that may occur. Such pump or blower is typically large and cumbersome to package in an automotive vehicle. Furthermore, the significant electrical power requirements of large blowers or pumps put a substantial burden on the limited electrical power available in automotive vehicles.

Accordingly, what is needed is an approach to catalytic converter heating that minimizes quenching to support oxidation of the engine exhaust gas elements of HC and CO as a source of additional heat energy without requiring-preclusively large heaters or air supplies.

SUMMARY OF THE INVENTION

The present invention resolves the described need by combining engine exhaust gas with catalytic converter heater output energy in a manner supporting oxidation of a significant portion of the HC and CO present in the exhaust gas, without requiring a heater or an air supply of preclusive size having preclusive power requirements.

Specifically, the present invention provides for a staged mixing of engine exhaust gas with energy output by a catalytic converter heater during a heating period following an engine cold start. Exhaust gas is passed into the heater output energy stream incrementally, such as at a series of mixing stages. At a first mixing stage, a portion of the volume of engine exhaust gas passing through the vehicle exhaust system meets the heater output energy stream and rapidly reaches temperatures supporting HC and CO oxidation. The energy released through this exothermic reaction cooperates with the heater output energy to elevate exhaust gas meeting therewith at a second mixing stage, to support further HC and CO oxidation, releasing even further energy in the form of heat for catalytic converter heating. This process continues through a plurality of mixing stages, until either the entire exhaust gas stream has been admitted to the combination of heater output energy and energy from the exotherm, or until the volume of relatively cool engine exhaust gas serves to finally quench the temperature of the combination to levels no longer supporting oxidation. The result is a dramatic increase in the heat energy available for application to the catalytic converter.

In a further aspect of this invention, an interface between an engine exhaust gas conduit and a catalytic converter heater outlet passes a predetermined portion of the engine exhaust gas to the heater outlet creating a first mixture of gasses. At a predetermined position downstream of the heater outlet, after the first combination has mixed and an amount of the CO and HC therein has oxidized, an additional predetermined portion of engine exhaust gas is passed through the interface for combination therewith, creating a second mixture of gasses. Further predetermined portions of the engine exhaust gas are likewise passed through the interface for controlled combination with prior mixtures, to oxidize as much of the CO and HC in the engine exhaust gas as possible, reducing levels of these undesirable exhaust gas elements, and creating an exotherm contributing to catalytic converter heating.

The interface may take the form of a wall having holes, flanges, or other openings therein at predetermined locations along a length of the wall and having predetermined opening areas, to control precisely the staged mixing of the engine exhaust gas with the heater exhaust gas. Further configurations to stage the mixing of these gasses within the scope of this invention include disposing the heater in the exhaust gas path of just one of the cylinder groups of a multiple-cylinder group engine, or placing exhaust gas flow stream dividers in the engine exhaust gas flow path to redirect a predetermined portion of the engine exhaust gas for mixture with the heater exhaust, such as at the heater outlet for oxidation thereof, with the remaining portion of the engine exhaust gas combined with the mixture at a later stage in the exhaust system.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
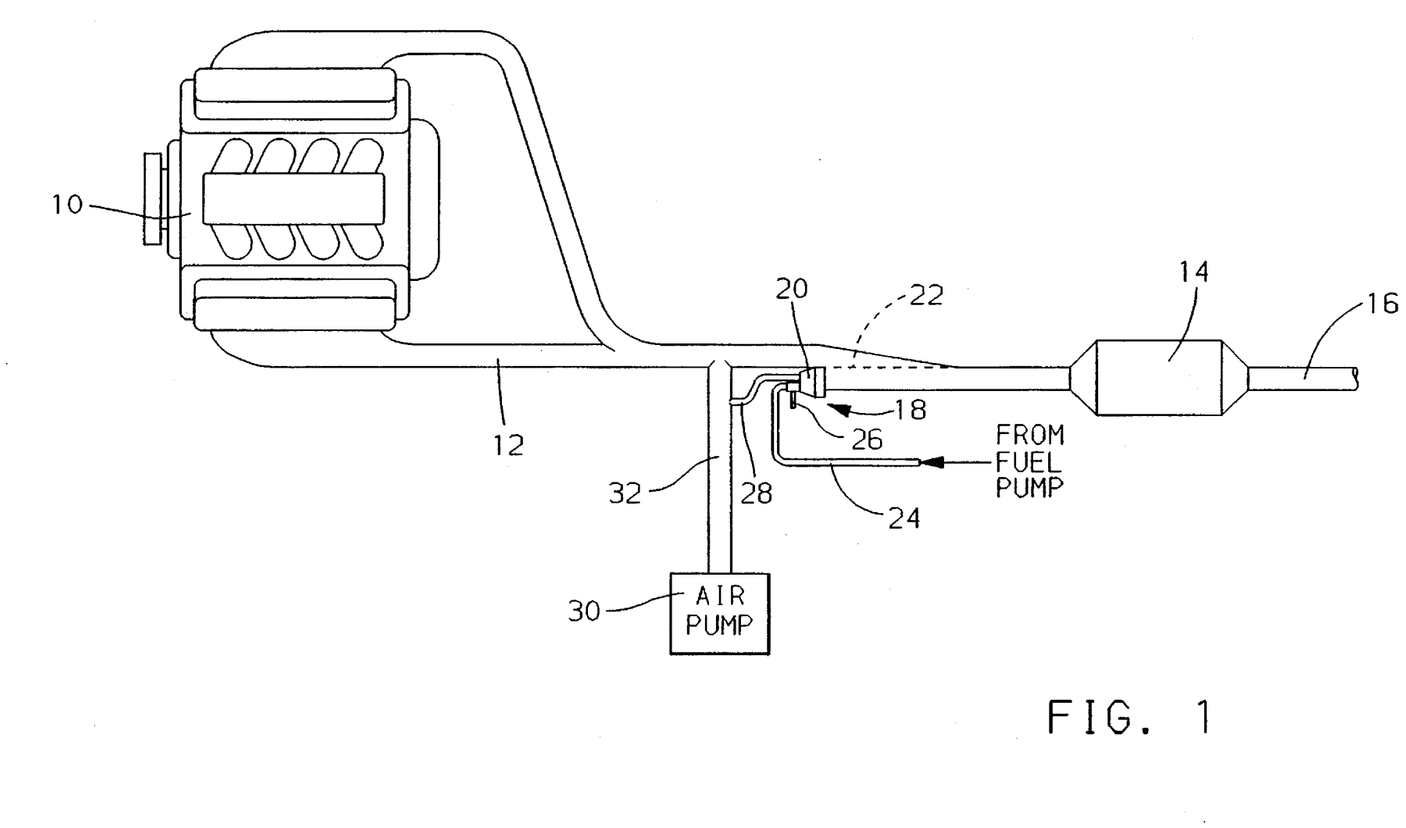
FIG. 1 is a general diagram of an internal combustion engine exhaust system including a catalytic converter heating configuration in accord with the preferred embodiment of this invention.

FIG. 1 schematically illustrates a typical application of the catalytic converter heater 18 in accord with the present invention to the exhaust system of an internal combustion engine 10. Exhaust gas, including its constituent elements of hydrocarbons HC, carbon monoxide CO, and oxides of nitrogen NOx produced through operation of engine 10 is passed through exhaust gas conduit 12 to conventional catalytic converter 14, for catalytic treatment therein. The materials and structure of the converter may be of any conventional type suitable to provide for the conversion of internal combustion engine exhaust gas constituents. The catalytically treated exhaust gas exits the converter 14 and passes to the atmosphere through tailpipe 16.

To provide for catalytic converter heating, fuel-based heater 18 is provided in a position offset from conduit 12, to deliver through membrane or flow diverter 22 output energy from the heater 18 to engine exhaust gas and ultimately to the catalytic converter 14. In this embodiment, the heater 18 takes the form of that disclosed in copending application 08/267,602, filed Jun. 28, 1994, attorney docket number H-172641, assigned to the assignee of this application, and incorporated herein by reference. A supply of fuel, such as gasoline, driven through fuel conduit 24 by a conventional fuel pump (not shown), is provided to a combustion chamber 20 in heater 18. For example, the fuel conduit 24 may terminate in a high pressure wafer nozzle for atomizing the fuel passing therethrough into the combustion chamber 20. An ignition source 26, such as a common spark plug is provided in proximity to the fuel passing into combustion chamber 20. When electrically excited from an external source, such as a conventional spark plug driver (not shown) controlled by an ignition controller (not shown), the ignition source 26 serves to ignite the fuel passing thereby substantially in the combustion chamber 20. To facilitate such combustion, a supply of air is provided to the combustion chamber 20, or to other portions of the heater 18. For example, as described in the copending application incorporated herein by reference, the air may be passed into a secondary combustion stage of the heater 18 for mixing with the fuel mixture and for a more complete combustion thereof. In this embodiment, the air is driven to the heater 18 through operation of a conventional electrically-powered air pump or blower 30 through air conduit 32 to dedicated heater air conduit 28. As is generally understood in the art and in accord with this invention, air may also be provided directly to the engine exhaust gas conduit 12 from the air conduit 32, as a source of oxygen contributing to the oxidation of CO and HC in the exhaust gas conduit 12 and in the catalytic converter 14.

Figure 2:
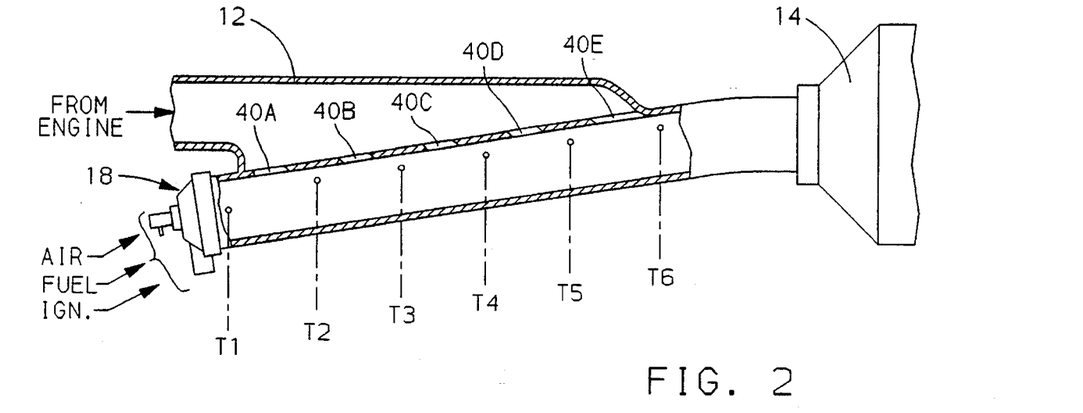
FIG. 2 illustrates hardware for staged introduction of engine exhaust gas with heater output energy in accord with the system of FIG. 1.

Referring to FIG. 2, heater 18 is schematically illustrated having inputs of fuel, air, and ignition for combustion therein. The manner of combining the inputs to the heater 18 in a manner supporting efficient and substantially complete combustion in the combustion chamber thereof may be as disclosed in the incorporated copending application 08/267, 602, filed Jun. 28, 1994. A series of passages 40A–40E along the length of the interface or flow diverter 22 (FIG. 1) between the exhaust gas conduit 12 and the heater output energy stream provide a plurality of paths through which the engine exhaust gas may pass for mixture with the heater output energy stream. The passages 40A–40E are shown generally in FIG. 2 as defined by slots, holes, or other openings in the wall of the interface 22. The wall is cylindrical and wraps around the heater, such as described in the incorporated reference. The position and size of the passages in the wall are predetermined for a controlled staged combination of engine exhaust gas with heater energy output to assist in a control of the temperature of the mixture created thereby.

Figure 3:
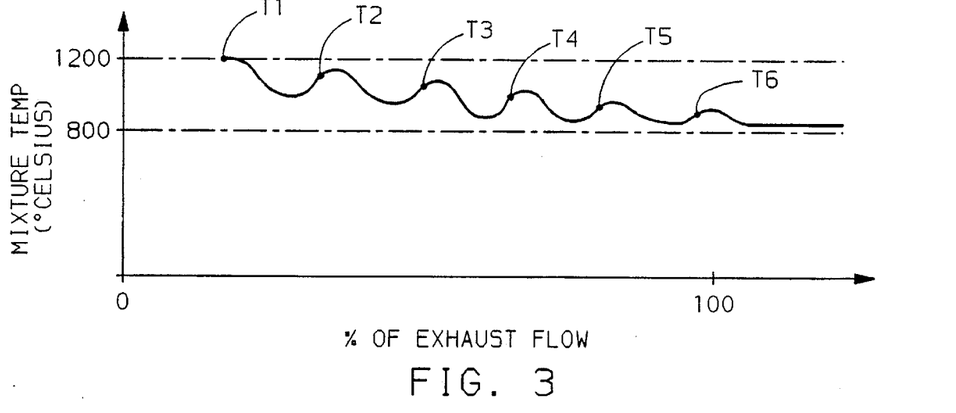
FIG. 3 is an exhaust gas temperature profile corresponding to the hardware of FIG. 2.

FIG. 3 provides a typical temperature profile of an operating heater using the staging generally illustrated in FIG. 2. The temperature of the heater exhaust at point T1, prior to any significant mixing with engine exhaust gas, is at a maximum of approximately 1200 degrees Celsius in this embodiment. Under the engine cold start conditions necessitating heater operation to aid in catalytic converter 14 heating, the engine exhaust gas will be at a substantially lower temperature than that output by heater 18, wherein the temperature of the combination may be below that required to support oxidation of the HC and CO present in the engine exhaust gas. However, the present invention provides a staged combination of the engine exhaust gas with the heater output energy, and thereby increases significantly the potential to preserve the temperature of the combination above that needed to support such oxidation, in the following manner.

Through passage 40A of FIG. 2, a predetermined portion of engine exhaust gas flow volume, such as about 25–30 percent of the flow volume, is provided directly to the heater output energy flow path. The quantity through the passage 40A and thus the temperature quenching caused thereby is limited to preserve the temperature of the resulting mixture well above that needed to support oxidation of HC and CO in the exhaust. For example, at point T2 (FIG. 2) the temperature is reduced from that at point T1, but is still above the 850 to 900 degrees Celsius needed for oxidation, wherein the temperature profile of FIG. 3 shows the temperature of the combination at point T2 is increasing. This increase is due mainly to the exothermic reaction of oxidation occurring slightly upstream of the point T2.

Like the passage 40A, the passage 40B allows a predetermined portion of the engine exhaust gas to pass to the heater output energy stream, such as approximately 15–25 percent of the engine exhaust volume in this embodiment. The volume of exhaust gas passing through passage 40B is application-dependent. In the application of the present embodiment, the volume passing through passage 40B is calibrated to be small enough to not quench the temperature of the heater output below 850–900 degrees Celsius. For example, at point T3 in FIG. 2, at which a significant portion of the volume of engine exhaust gas may be assumed to be mixed with the heater exhaust gas (which already includes the products of any oxidation occurring through the mixture of the heater exhaust with the volume of engine exhaust gas passing through passage 40A), the temperature of the mixture is shown at point T3 in FIG. 3 to be well-above the oxidation temperature, and to be increasing. The increase is due to the activity of the exotherm at T3.

Likewise, each of the remaining passages 40C, 40D, and 40e are tuned in both size and position to allow further staged or incremental mixing of engine exhaust gas with heater output energy and exotherm energy. Preferably, the passages are located close to the heater 18, to minimize any reduction in temperature caused by cooling in the conduit between the heater and the passages. The size of each of the passages may be adjusted to maximize oxidation activity of the engine exhaust gas to maximize the output of the exotherm for additional catalytic converter heating, and to reduce undesirable exhaust gas elements. While the entire volume of exhaust gas from the engine 10 will ultimately pass to the heater output energy path via the set of passages making up the interface 22, the present invention provides that the release of exhaust gas from the engine may be gradual to oxidize as much of the engine exhaust gas constituents of CO and HC as possible before the engine exhaust gas quenches the heater output temperature to levels not supporting the oxidation. As illustrated in FIG. 3, the magnitude of the oscillations in the temperature profile decrease in magnitude as the average profile magnitude decreases. Such decreases reflect a less active exotherm, due to increased temperature quenching, and to a reduced availability of the necessary elements of CO, HC, and $O_2$.

Figure 4:
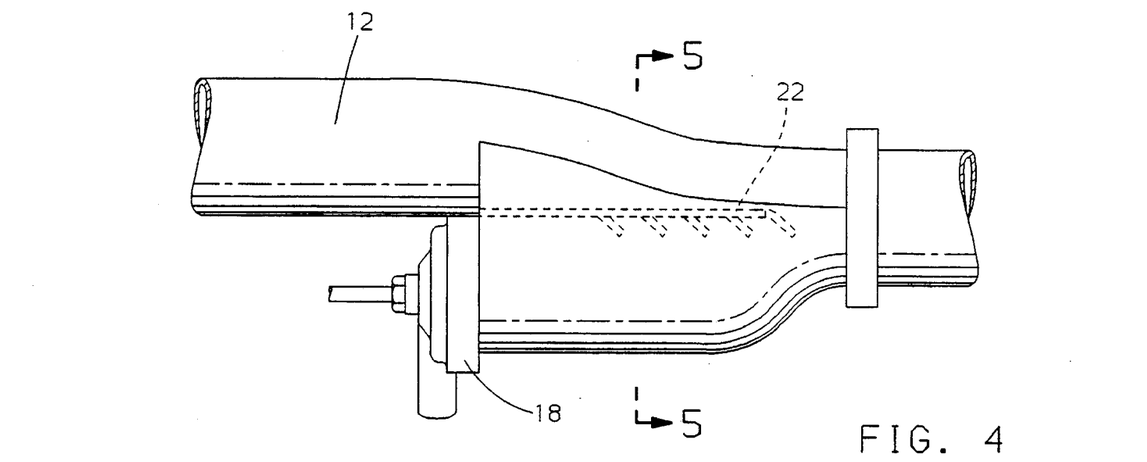
FIG. 4 is a top external view of a preferred offset interface of a catalytic converter heater and an exhaust gas conduit in accord with this invention.
Figures 5, 6:
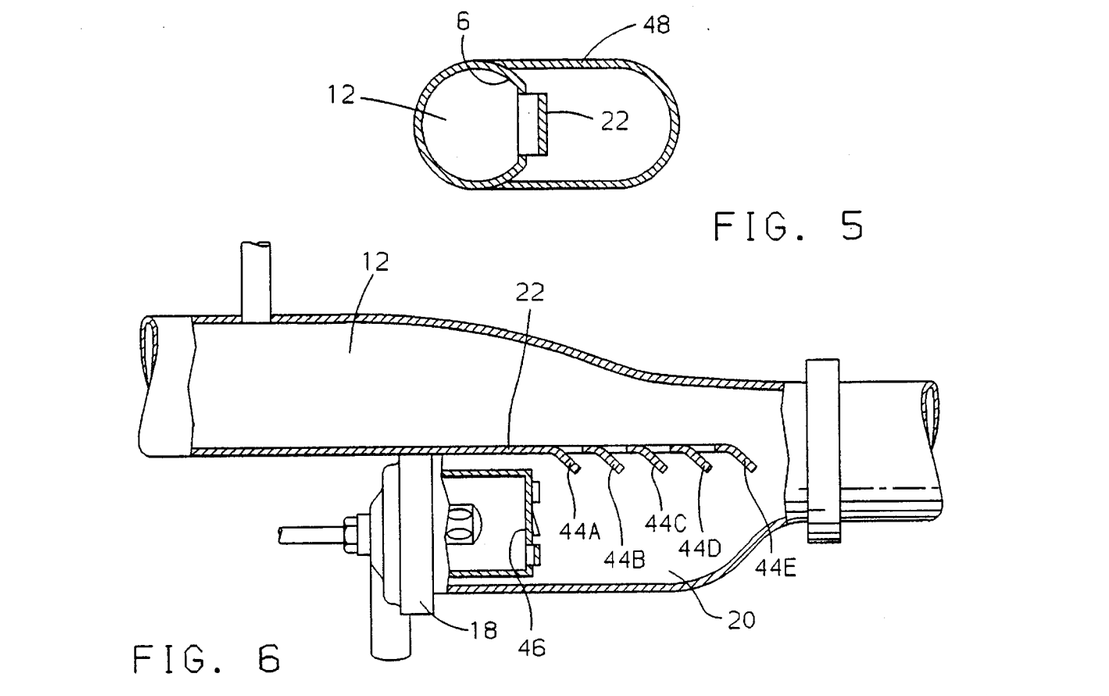
FIG. 5 provides a cutaway view of the offset heater and the engine exhaust gas conduit taken along line 5—5 of FIG. 4.
FIG. 6 is a top cutaway view of the preferred offset interface of FIG. 4.

FIG. 4 is a top view of a portion of engine exhaust gas conduit 12 with the heater 18 offset from the conduit to minimize restriction of exhaust gas passing through the conduit 12. Interface 22 is provided through which a portion of the engine exhaust gas passes for a staged or incremental combination with the heater 18 output energy stream in accord with this invention. FIG. 5 provides a cut away view taken along view 5—5 of FIG. 4 of the wall 6 between the heater 18 and the engine exhaust gas conduit 12, as well as the housing 48 in which the heater 18 is disposed in this embodiment. Interface 22 is shown on a portion of the wall 6 for communication of the engine exhaust gas with the heater output.

FIG. 6 is a top cut away view of the heater configuration of FIG. 4, detailing a series of flanges 44A–44E on interface 22 defining a plurality of passages through which the engine exhaust gas passes into the combustion chamber 20 of heater 18 for combination with the exhaust gas of the heater. A swirler 46, such as described in the copending application incorporated herein by reference, provides for a mixing of the fuel and a supply of air in the combustion chamber, such as in a secondary stage thereof between the swirler 46 and the portion of the chamber 20 in which engine exhaust gas mixes with the heater exhaust.

The plurality of flanges 44A–44E provide for passage of engine exhaust gas into the path of the heater output in a staged manner in accord with the principles of this invention. Flanges 44A–44E define a series of passages through the interface 22 so that engine exhaust gas may pass therethrough in appropriate portions for oxidation in the chamber 20 of heater 18. The number and shape of such flanges and their corresponding openings for passage of engine exhaust gas may vary within the scope of this invention. A larger number of flanges and openings, such as of smaller size than those of FIG. 6 may be used, or the number may be smaller than the five of FIG. 6, and each of the smaller number may be larger in size than those of FIG. 6. The individual flanges may be sized for each individual engine exhaust system application to allow predetermined increments of the volume of engine exhaust gas to pass into the high temperature heater exhaust according to a predetermined staging schedule. For example, the flange 44A may be sized so the passage through interface 22 corresponding thereto allows approximately 20–25 percent of the volume of engine exhaust gas passing through conduit 12 to pass directly into the path of the heater output energy stream. Such a volume may then be rapidly elevated to temperatures supporting oxidation of the CO and HC therein in accord with this invention. The flange 44B may be sized to allow approximately 20–25 percent of the volume of engine exhaust gas passing through conduit 12 to pass therethrough, as the temperature quenching effect of such a portion of the volume may not reduce the heater exhaust temperature below that supporting CO and HC oxidation. The remaining flanges 44C–44E should likewise be of predetermined size to support a maximum level of oxidation of engine exhaust gas constituents prior to a quenching of the heater output to temperatures less than would support oxidation.

Figures 7, 8:
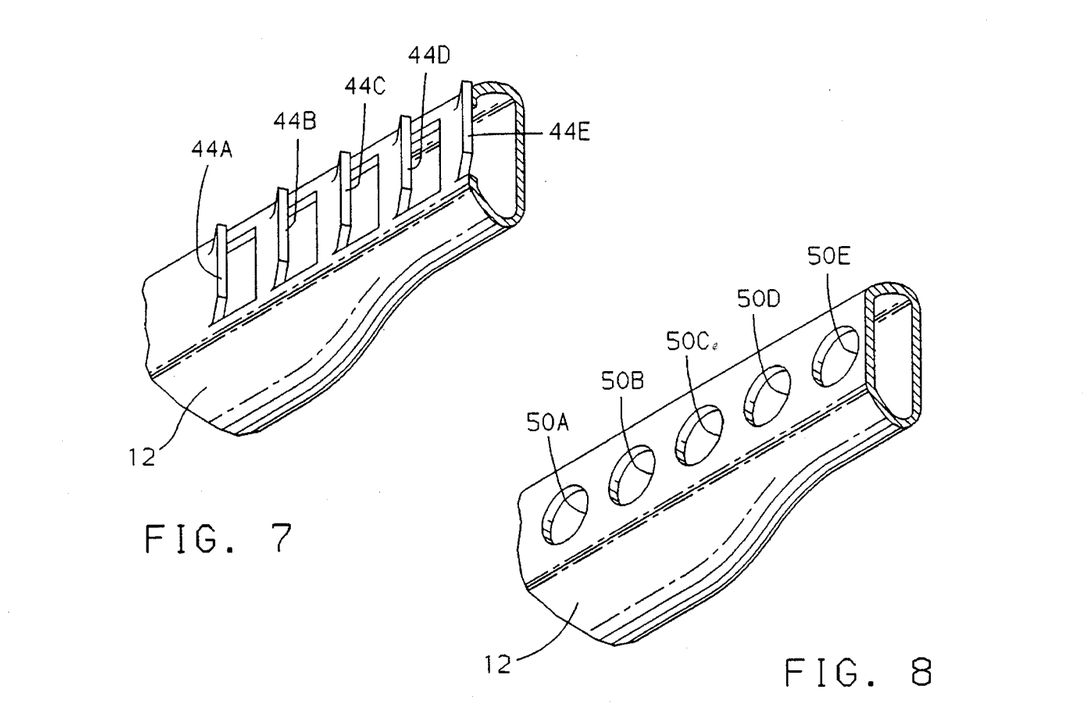
FIG. 7 is a front view of the interface of FIG. 6.
FIG. 8 is a front view of an alternative interface of FIG. 6 in accord with this invention.

FIG. 7 provides a view of the flanged interface between the exhaust conduit 12 and the chamber 20 corresponding to that of FIG. 6, showing a flange shape and location corresponding to an embodiment of this invention. As illustrated in FIG. 7, a significant portion of the engine exhaust gas may pass to the catalytic converter without passing directly through any of the passages 44A–44E. Such an embodiment advantageously provides for a minimum perturbation in the restrictiveness of the engine exhaust flow through the exhaust system.

FIG. 8 details an alternative embodiment of the interface 22 corresponding to FIG. 6 in which a series of openings or holes 50A–50E along conduit 12 provide for passage of engine exhaust gas for a staged mixing or combination with the energy output by heater 18 (FIG. 6). The openings 50A–50E may be of a single area, or may be individually sized according to the constraints of the application. For example, the hole 50A, being the closest to the outlet of the heater 18, should be of an area allowing a maximum volume of engine exhaust gas to pass without quenching heater output temperature below the oxidation temperature. Opening 50B may be sized with an area slightly smaller than that of 50A, again to pass the maximum volume of engine exhaust gas therethrough for oxidation in the heater output energy stream. The remaining openings may likewise be sized for the application to maximize usage of the heater output energy for CO and HC oxidation prior to temperature quenching thereof.

Figure 9:
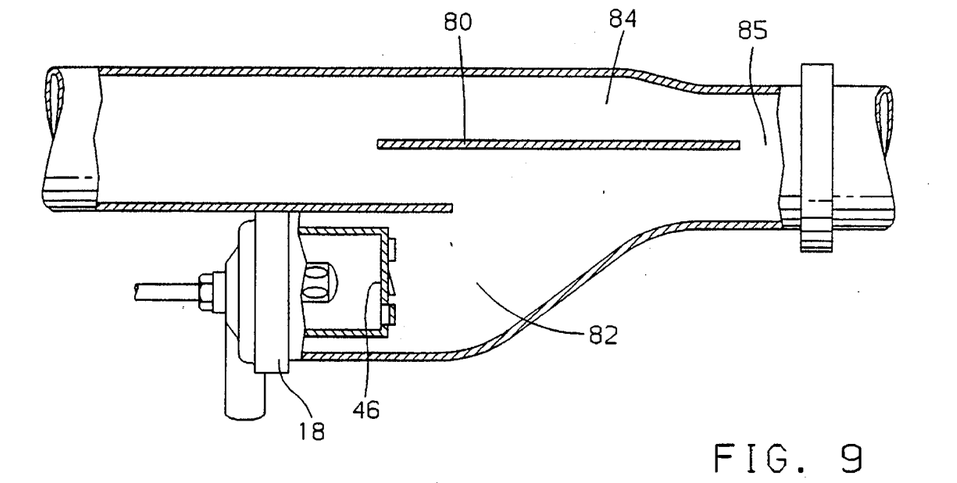
FIG. 9 is a top view of an engine exhaust gas flow stream divider in accord with this invention.

FIG. 9 illustrates an alternative embodiment within the scope of this invention in which an impermeable barrier or flow diverter 80 is efficiently and inexpensively installed in a conventional exhaust system, and wherein a minimum of engine exhaust gas backpressure increase results from the installation. Generally, the barrier divides the conduit through which engine exhaust gas passes upstream of the catalytic converter 14 into two passages. The passage 82 between the barrier 80 and the heater 18 is exposed directly to the heater 18 output energy. Oxidation of a portion of the engine exhaust gas passing through passage 82 may be expected through a proper positioning of the barrier 80. In accord with the principles of this invention, the barrier should be positioned to allow a maximum total oxidation of CO and HC in the engine exhaust gas volume. Most of the oxidized volume will correspond to that passing through passage 82. However, some oxidation may correspond to that portion of the volume passing through passage 84 and reacting with the outlet of passage 82 substantially at position 85, and the overall total oxidation including that at position 85, not the total through either passage should be maximized. Only through a conventional calibration process in which the barrier location of the most benefit is determined for a specific system, will the proper location be designated.

For example, in this embodiment, the barrier may be positioned so that approximately 35–50 percent of the engine exhaust gas volume passes through passage 82. Swirler 46 is provided upstream of the barrier 80 in the heater exhaust path to provide for a proper mixing of fuel and air out of the heater 18, as described in the corresponding application incorporated herein by reference.

Dual Cylinder Group Application

Figure 10:
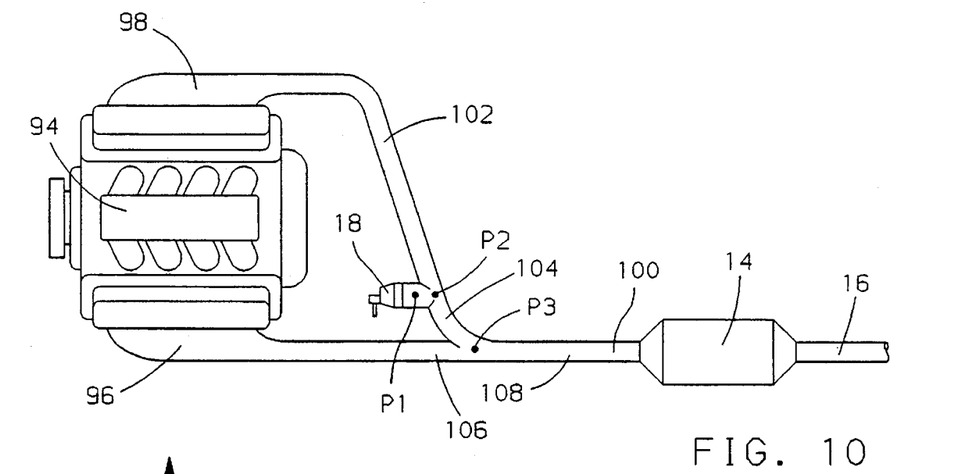
FIG. 10 is a top view of an embodiment of this invention applied in a dual cylinder group engine.

In an internal combustion engine 94 having at least two exhaust groups, the FIG. 10 illustrates an embodiment of this invention in which a heater 18 is inexpensively located in the engine exhaust gas conduit or downpipe 102 so as to provide for elevation of exhaust gas temperature to oxidation temperatures with reduced heater output requirements and with reduced excess air supply requirements. Specifically, engine cylinders of a first cylinder group expel exhaust gas for collection in exhaust manifold 98 during engine operation. The exhaust gas is passed from the exhaust manifold 98 through downpipe 102 having heater 18 mounted in an offset position relative to the downpipe, for minimum increase in backpressure in the downpipe. The heater 18 is active during a predetermined catalytic converter 14 heating period following a cold start of engine 94. When active, the heater passes its exhaust directly into downpipe 102 for combination with the exhaust from the first group of cylinders, yet without the additional temperature quenching effect caused by the exhaust of a second group of cylinders. Accordingly, temperatures supporting oxidation may be preserved in downpipe 102, such as at mixing position 104.

Engine air/fuel ratio control may be provided on a cylinder-by-cylinder basis through application of generally-understood engine control practices to engine 94. Such control may provide for a slightly rich air/fuel ratio in the cylinders of the first cylinder group, increasing the engine exhaust energy content passed through manifold 98 and downpipe 102 to mix with heated exhaust and oxidize substantially at the position 104 in downpipe 102. This control advantageously may reduce the heater fuel rate and the heater air rate requirement over conventional heaters. Furthermore, as the heater air supply must be delivered at higher pressure than that of any excess air provided to the engine exhaust gas, air supply packaging and electrical power requirements may thereby be relieved through use of a more compact heater and a lower output air supply.

During operation of engine 94, the cylinders of the second cylinder group of engine 94 expel exhaust gas which is collected in exhaust manifold 96, and passed through downpipe 106 for combination with the oxidized engine exhaust gas and heater exhaust, such as at position 108 in conduit 100. Further oxidation may be provided substantially at the position 108, as the increased energy from the exotherm at the position 104 in downpipe 102 may elevate the exhaust temperature in downpipe 102 sufficiently high to support further oxidation of the relatively cool exhaust gas passing through downpipe 106 during an engine cold start.

Figure 11:
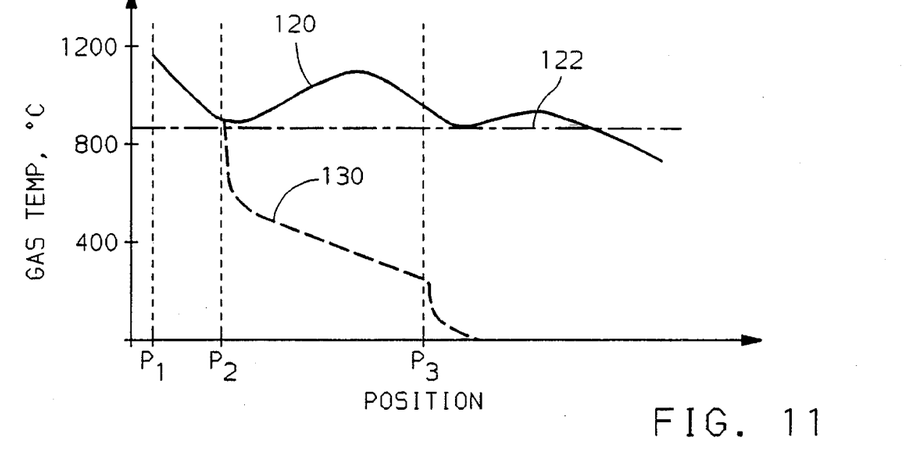
FIG. 11 is a temperature profile corresponding to the embodiment illustrated in FIG. 10.

FIG. 11 generally diagrams a temperature profile corresponding to the temperature of the engine and heater exhaust gasses passing through the exhaust system of FIG. 10. Position P1 corresponds to the heater 18 outlet at which a maximum temperature, approaching 1200 degrees Celsius is reached during heater operation. Moving downstream of position P1 losses reduce the temperature of the heater output exhaust. Such losses increase with distance away from the heater, and provide an incentive to locate the catalytic converter as close to the heater output as possible in the exhaust system.

At position P2, slightly upstream in the exhaust gas flow from the oxidation position 104 (FIG. 10), heater exhaust gas temperature is further quenched by the relatively cool exhaust gas from the first cylinder group passing through downpipe 102. The cool exhaust gas mixes with and is heated by the heater output energy between position P2 and oxidation position 104 (FIG. 10) at which the exotherm contributes energy to the mixture of gasses, increasing the mixture temperature as indicated by profile 120 in FIG. 11. The profile 130 of FIG. 11 generally illustrates temperature behavior in the absence of the exothermic activity, wherein a substantially linear decrease in temperature as a function of position away from the heater 18 will occur, including substantial temperature decreases at or shortly downstream of positions P2 and P3 at which positions heater gasses mix with the relatively cool engine exhaust gas following an engine coldstart.

As illustrated in profile 120 of FIG. 11, the contribution of the exotherm to exhaust temperature can be used to maintain the mixture temperature above that needed to support oxidation of CO and HC in the engine exhaust, which is approximately 850–900 degrees Celsius, illustrated in FIG. 11 as temperature threshold 122. At the magnitude peak of profile 120 in FIG. 11, the exothermic activity at or slightly downstream of position 104 (FIG. 10) is reduced significantly, such as due to a decreased availability of one or more of the elements of CO, HC, or $O_2$ needed to support such activity, but not due to insufficient temperature of the mixture. The energy lost through mixture cooling will eventually overcome the energy added through any remaining oxidation, causing the overall mixture temperature to decrease in proportion to the distance travelled through downpipe 102.

Moving to position P3, at which engine exhaust gas from the second cylinder group and delivered by downpipe 106 begins to mix with the combined heater and first cylinder group exhaust, further temperature quenching will occur upon initial mixture of the cool exhaust from the second cylinder group, driving the mixture temperature near the oxidation threshold 122 (FIG. 11). Assuming the mixture temperature remains above the threshold, further oxidation will occur after a period of mixing and heating of the engine exhaust from the second cylinder group, such as during passage of the mixture between the position P3 and the oxidation position 108 in FIG. 10. The resulting exothermic reaction will drive up the mixture temperature until oxidation activity reduces, such as due to a reduced availability of HC, CO, or $O_2$, to a level at which energy losses through cooling in the conduit 100 exceed the energy added to the mixture through oxidation. At such a position, mixture temperature will begin to decrease, eventually dropping below the oxidation threshold 122 (FIG. 11), after which the temperature decrease will become more significant due to the absence of oxidation.

The various configurations describing the staged introduction of engine exhaust gas with the output of a catalytic converter heater to increase significantly the exothermic reaction of HC and CO in the exhaust, to reduce such exhaust gas elements and to increase the energy delivered to the catalytic converter during a heating period provided herein are not meant to be exhaustive, but are merely meant to detail preferred embodiments of this invention.

The preferred embodiment for the purpose of explaining this invention is not to be taken as limiting or restricting the invention since many modifications may be made through the exercise of ordinary skill in the art without departing from the scope of this invention.

The embodiments of the invention in which a property or privilege is claimed are described as follows:

1. An apparatus for combining internal combustion engine exhaust gas with heat energy emitted by an exhaust gas heater, comprising:

an exhaust gas conduit through which a volume of internal combustion engine exhaust gas passes;

a heater chamber having an inlet portion adjacent the heater through which the emitted heat energy enters the heater chamber and having an outlet portion opposing the inlet portion through which the emitted heat energy exits the heater chamber; and a substantially flat exhaust gas conduit flow diverter wall along a length of the exhaust gas conduit for diverting a flow of exhaust gas:

wherein emitted heat energy passing through the heater chamber outlet portion is combined with exhaust gas diverted by the flow diverter wall on a first side of the flow diverter wall, for staged mixing of exhaust gas with the emitted heat energy.

2. The apparatus of claim 1, wherein the substantially flat exhaust gas conduit flow diverter wall comprises a series of openings formed in a substantially flat portion of the exhaust gas conduit positioned substantially along the direction of flow of the exhaust gas through the exhaust gas conduit, through each of which series of openings exhaust gas passes from the exhaust gas conduit to the first side of the flow diverter wall, for staged mixing of exhaust gas with the emitted heat energy.

3. An apparatus for introducing internal combustion engine exhaust gas to heat energy output by a heater, comprising:

an exhaust manifold into which a portion of the internal combustion engine exhaust gas passes;

an exhaust gas conduit positioned to receive exhaust gas passed to the exhaust manifold, the conduit having a series of openings along a substantially flat length thereof, the openings forming an interface;

a heater outlet positioned between the heater and the interface to form a path through which the heat energy passes from the heater to the interface, the heat energy passing through the openings forming the interface for a staged mixing with the exhaust gas; and a catalytic treatment device disposed on the exhaust gas conduit downstream of the interface, for receiving the combined exhaust gas and heat energy.

4. An apparatus for combining internal combustion engine exhaust gas with heat energy emitted by an exhaust gas heater, comprising:

an exhaust gas conduit through which a volume of internal combustion engine exhaust gas passes;

a heater chamber adjacent the heater through which the emitted heat energy passes, the heater chamber opening into the exhaust gas conduit at a mixing location in the exhaust gas conduit, the heater chamber guiding the emitted heat energy to the mixing location to form a mixture with exhaust gas; and a substantially flat flow diverter disposed in the exhaust gas conduit upstream of the mixing location, for diverting a portion of the exhaust gas away from the mixing location to a downstream mixing location, at which the diverted portion may be combined with the mixture formed at the mixing location.

5. A method for heating relatively low temperature internal combustion engine exhaust gas during passage of the exhaust gas through an exhaust gas flow path for delivering heat energy to a catalytic treatment device, comprising the steps of:

igniting a mixture of air and fuel in the exhaust gas flow path for generating heat energy;

exhausting the generated heat energy to a first mixing location along the exhaust gas flow path;

diverting a portion of relatively low temperature engine exhaust gas to the first mixing location for mixing with the exhausted heat energy to form a first exothermic mixture;

passing the first exothermic mixture to a second mixing location along the exhaust gas flow path;

diverting an additional portion of relatively low temperature engine exhaust gas to the second mixing location for mixing with the first exothermic mixture to form a second exothermic mixture; and delivering a portion of the heat energy of the second exothermic mixture to the catalytic treatment device.

* * * * *

UNITED STATES PATENT AND TRADEMARK OFFICE
CERTIFICATE OF CORRECTION

PATENT NO. : 5,570,576
DATED : May 12, 1998
INVENTOR(S) : Michael DeGregorio et al.

It is certified that error appears in the above-identified patent and that said Letters Patent is hereby corrected as shown below:

At Column 2, lines 47 to 48, change "2-[4-(4-chloro-1,2-diphenyl-but-1-enyl)phenoxy]ethanol)" to --Z-2-[4-(4-chloro-1,2-diphenyl-but-1-enyl)phenoxy]ethanol)--.

At Column 2, lines 49 to 50, change "4-[4-chloro-1-[4-(2-hydroxyethoxy) phenyl]-2-phenyl-but-1-enyl]phenol)" to --Z-4-[4-chloro-1-[4-(2-hydroxyethoxy) phenyl]-2-phenyl-but-1-enyl]phenol)--.

At Column 2, lines 51 to 52, change "4-[4-chloro-1-[4-(2-hydroxyethoxy) phenyl]-2-(4-hydroxyphenyl)but-1-enyl]phenol" to --Z-4-[4-chloro-1-[4-(2-hydroxyethoxy) phenyl]-2-(4-hydroxyphenyl)but-1-enyl]phenol--.

Signed and Sealed this

Sixth Day of October, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,570,576

DATED : November 5, 1996

INVENTOR(S) : Frank Ament

It is certified that error appears in the above-identified patent and that said Letters Patent is hereby corrected as shown below:

This certificate supercedes Certificate of Correction issued October 6, 1998, the number was erroneously mentioned and should be deleted since no Certificate of Correction was granted.

Signed and Sealed this

Twenty-seventh Day of March, 2001

Attest:

NICHOLAS P. GODICI

Attesting Officer

*Acting Director of the United States Patent and Trademark Office*